Nov. 17, 1931.  H. W. McCREARY  1,832,644

ANIMAL TRAP

Filed April 7, 1930

INVENTOR
HARRY W. McCREARY
BY
ATTORNEYS

Patented Nov. 17, 1931

1,832,644

UNITED STATES PATENT OFFICE

HARRY W. McCREARY, OF LITITZ, PENNSYLVANIA, ASSIGNOR TO ANIMAL TRAP COMPANY OF AMERICA, OF LITITZ, PENNSYLVANIA, A CORPORATION OF PENNSYLVANIA

ANIMAL TRAP

Application filed April 7, 1930. Serial No. 442,184.

This invention relates to spring actuated animal traps.

It is the main object of the invention to provide an improved form of trap of the above character and in particular, to provide for the simplified opening and locking of the jaws of such traps.

It is a further object of the invention to provide a spring actuated animal trap in which the jaws are arranged to open automatically upon setting of the spring and in which accidental closing of said jaws is prevented.

Further features and objects of the invention will be apparent from the following description taken in conjunction with the accompanying drawings in which.

Figure 1:
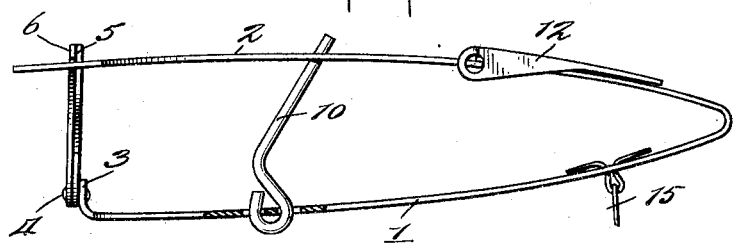
Figure 1 is a side elevation of one form of trap to which this invention is applied, the trap being in the closed or sprung position.
Figure 2:
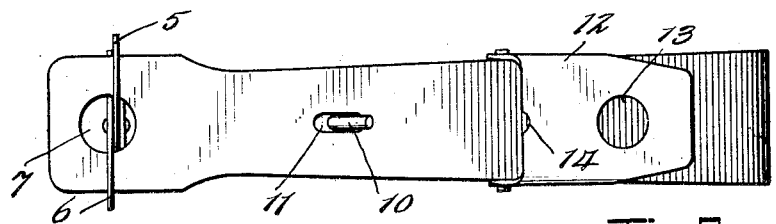
Figure 2 is a plan view of the same trap in the same position.
Figure 3:
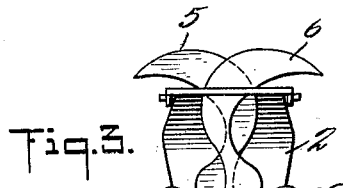
Figure 3 is an end view of the same trap in the same position.

The invention can be applied to any form of animal trap comprising spring means and jaw members actuated thereby. In order, however, to indicate more clearly how the invention can be carried into effect I will now specifically describe the convenient embodiment illustrated in the drawings, which, it is to be understood, is given solely by way of example.

The specific embodiment illustrated in the drawings, is a trap adapted for the catching of burrowing rodents, such as gophers, and it is adapted to be placed within a tunnel or burrow along which the animal is expected to pass.

The trap comprises a base portion 1, and a spring member 2, which in this present instance are conveniently formed together as one integral member. At one end of the base is an upturned lug 3 to which is pivoted, in any convenient manner such as by means of a rivet 4, a pair of jaws 5 and 6.

The movable part of the spring member 2 has an aperture 7 within which the jaw members 5 and 6 are located, and these jaw members are bent over at their top ends to form claws adapted to grip the animal, and the arrangement is such that the claws extend laterally to such an extent that the spring cannot become detached from the jaws: in other words, a part of the jaws 5 and 6 is always located within the aperture 7.

Attached to or, in this present instance, formed integrally with each jaw member is a lug, projection or extension 8 and 9 respectively so that in effect each jaw comprises a two armed pivoted member. It will be seen from the drawings that each lug or extension 8 or 9 of the jaw member 5 or 6 respectively, is at an angle to the main part of the jaw and is also at an angle to the axis of pivotation thereof. In the embodiment illustrated the axis of pivotation coincides with the longitudinal direction of the trap. Each lug or extension is preferably of a length greater than half the width of the aperture 7, for a purpose hereinafter indicated.

The trap is preferably provided with a catch and a tripping pan, and in the specific embodiment illustrated, the catch member 10 is pivoted to the base 1, its upper end passing through an elongated slot 11 in the spring member 2. Pivoted also on the upper portion of the combined base and spring member is a pan 12 having an aperture 13 and a notch 14.

A chain 15 for anchorage purposes may also be provided if desired.

Figure 4:
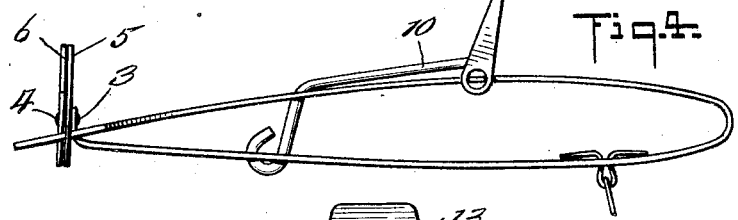
Figure 4 is a side elevation of the same trap in the open or set position.
Figure 5:
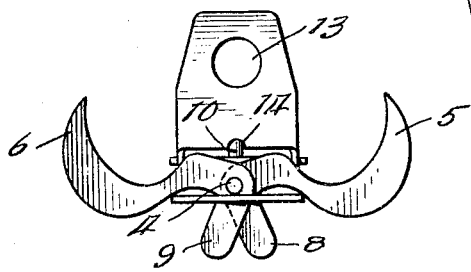
Figure 5 is a view similar to Figure 3, again with the trap in the open or set position.

In the operation of the trap it will be seen that the aperture 7 of the spring forms an engaging portion which engages the jaw members 5 and 6 and the setting of the trap is attained by compressing spring 2 from the position shown in Figure 1 to that shown in Figure 4. Owing to the fact that the lugs 8 and 9 lie within the path of movement of the movable portion of the spring 2 they will, upon being pressed by the same, be turned about their axis of pivotation and will be forced to open the jaws 5 and 6 into the position shown in Figure 5. Whilst the spring is compressed in this manner the pan 12 is tilted upwardly into the position shown in Figure 4, and the free end of the catch or trigger 10 is placed under the notch 14. Whilst in this position it will be seen that the jaw members cannot close owing to the fact that the lugs 8 and 9 are each of a length greater than half the width of the aperture 7 and contact with the engaging portion of the spring around the aperture. It is only therefore, when the trap is tripped or released that the jaws can close.

In order to provide a clear line of sight the aperture 13 is provided in the pan 12. On account of the habit of certain rodents of pushing ground before them when burrowing, the pan 12 is set back a considerable distance from the jaw members 5 and 6. The ground pushed in front of the animal upon contacting with the pan 12 will move the same and release the trigger 10 so that the spring will be able to spring upwardly into its open position shown in Figure 1 and bring the jaw members 5 and 6 together upon the animal.

It will be noted from this construction that a part of the movable portion or end of the spring is always within the angles formed by the jaws and lugs, which in effect are two armed pivoted levers.

A further advantage of the lugs 8 and 9 is that they can be pressed into the ground when the trap is set and thus cooperate with the chain 15 to effect a certain amount of anchorage.

It will be seen from the above that I have provided a trap which is arranged so that upon compression of the spring to the set position the jaws are automatically opened, and furthermore, that once the spring is set and retained by the trigger or catch the jaws cannot close since the lugs, projections, or extensions contacting with the engaging portion of the spring prevent their movement and consequently also prevent the angular rotation of the jaws to the closed position.

I claim:—

1. An animal trap comprising a spring member having an aperture, and pivoted jaw members actuated thereby and passing through said aperture, said jaw members having an integral part in the path of movement of said spring and adapted to open said jaws upon contact by said spring.

2. An animal trap comprising a spring member having an aperture, and pivoted jaw members, lugs on said jaw members passing through said aperture adapted to contact with said spring when in the set position to prevent accidental closing of said jaws.

3. An animal trap comprising a spring member having an aperture, and pivoted jaw members, lugs on said jaw members passing through said aperture at an angle to the axis of pivotation and in the path of movement of said spring and adapted to contact therewith.

4. An animal trap comprising a spring member having an opening, and a pair of jaws pivoted about a common axis and located in said opening, a lug on each jaw at an angle to the same and to said axis, and located in the path of movement of said spring.

5. An animal trap comprising a pair of jaws and a spring member having an aperture and shaped and arranged to have a portion of the edge of said aperture contacting with said jaws, an integral part of each jaw being adapted upon contact with said portion to open said jaws.

6. An animal trap comprising a pair of pivoted jaws and a spring member having an opening, a portion of the edge of said opening being adapted to contact therewith to close the same, a lug on each of said jaws at an angle to the axis of pivotation and adapted to contact with said portion upon compression of said spring.

7. An animal trap comprising a sheet metal spring having a movable part, and a pair of two-armed jaws, said movable part being within the angle between said arms.

8. An animal trap comprising a base, a sheet metal spring integral with said base, a pair of pivoted jaw members having a common pivot on said base, and a lug on each jaw member at an angle to the same and to the axis of said pivot, and in the path of movement of said spring.

9. An animal trap comprising a base, a spring attached to said base and having an aperture, a pair of pivoted jaw members having a common pivot and passing through said aperture, and a lug on each jaw member of a length greater than half the width of the aperture.

10. An animal trap comprising a spring having an aperture, and a pair of jaw members passing through said aperture and having a common pivot, a lug on each jaw member at an angle to the same and to the axis of pivotation, and of a length greater than half the width of said aperture.

In testimony whereof I affix my signature.

HARRY W. McCREARY.